United States Patent
Cho

(10) Patent No.: US 8,502,918 B2
(45) Date of Patent: Aug. 6, 2013

(54) METHOD AND APPARATUS FOR INTERDEPENDENTLY CONTROLLING AUDIO/VIDEO SIGNALS

(75) Inventor: Seung-ki Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1152 days.

(21) Appl. No.: 12/013,581

(22) Filed: Jan. 14, 2008

(65) Prior Publication Data

US 2009/0040379 A1  Feb. 12, 2009

(30) Foreign Application Priority Data

Aug. 8, 2007  (KR) ........................ 10-2007-0079782

(51) Int. Cl.
*H04N 9/44* (2006.01)
(52) U.S. Cl.
USPC .............................. 348/515; 348/554; 725/93
(58) Field of Classification Search
USPC .................... 348/738, 722, 553, 515; 725/93, 725/116
See application file for complete search history.

(56) References Cited

U.S. PATENT DOCUMENTS

| 5,241,352 | A | * | 8/1993 | Lange et al. ................. 399/102 |
| 5,416,534 | A | * | 5/1995 | Hayashi et al. .............. 348/687 |
| 6,067,126 | A | * | 5/2000 | Alexander .................... 348/738 |
| 6,182,150 | B1 | * | 1/2001 | Shin .............................. 709/248 |
| 6,188,439 | B1 | * | 2/2001 | Kim .............................. 348/553 |
| 6,188,731 | B1 | | 2/2001 | Kim |
| 6,263,502 | B1 | * | 7/2001 | Morrison et al. ............... 725/47 |
| 6,956,871 | B2 | * | 10/2005 | Wang et al. .................. 370/503 |
| 7,526,786 | B1 | * | 4/2009 | Adams et al. .................. 725/54 |
| 2002/0154691 | A1 | * | 10/2002 | Kost et al. ................ 375/240.01 |
| 2005/0195331 | A1 | * | 9/2005 | Sugano et al. ............... 348/571 |

FOREIGN PATENT DOCUMENTS

| JP | 11-0352611 A | 12/1999 |
| JP | 2004-0159257 A | 6/2004 |
| KR | 10-0224099 B1 | 7/1999 |
| KR | 10-2000-0031418 A | 6/2000 |
| WO | 00/45597 | 8/2000 |
| WO | 2006/062313 A1 | 5/2006 |

* cited by examiner

*Primary Examiner* — Annan Shang
(74) *Attorney, Agent, or Firm* — Sughrue Mion, PLLC

(57) ABSTRACT

A signal control method of analyzing audio and video signals and interdependently enhancing each audio and video signal with regard to a multimedia input sequence including audio and video signal components are provided. The method of controlling audio and video signals includes: analyzing characteristics of components of the audio and video signals; interdependently modifying the audio signal and/or video signal according to the analyzed characteristics of components of the audio and video signals; and synchronizing the modified audio and video signals.

16 Claims, 5 Drawing Sheets

METHOD AND APPARATUS FOR INTERDEPENDENTLY CONTROLLING AUDIO/VIDEO SIGNALS

CROSS-REFERENCE TO RELATED PATENT APPLICATION

This application claims priority from Korean Patent Application No. 10-2007-0079782, filed on Aug. 8, 2007 in the Korean Intellectual Property Office, the disclosure of which is incorporated herein in its entirety by reference.

BACKGROUND OF THE INVENTION

1. Field of the Invention

Methods and apparatuses consistent with the present invention relate to analyzing audio and video signals and interdependently enhancing each audio and video signal with regard to a multimedia input sequence including audio and video signal components, and more particularly, to analyzing characteristics of a component of an audio signal, controlling a video signal based on the analyzed characteristics of the audio signal, analyzing characteristics of a component of the video signal, and controlling the audio signal based on the analyzed characteristics of the video signal, thereby enhancing quality of an output sequence that can be eventually experienced by a person.

2. Description of the Related Art

Related art methods of enhancing audio and video quality process audio and video signals in their respective domains and control each output audio and video signal.

For example, related art methods of processing audio and video signal are shown in FIGS. 1 and 2.

FIG. 1 is a block diagram of a related art apparatus of reinforcing low and intermediate frequency components of an audio signal.

A small-sized speaker mounted in a portable device such as a notebook personal computer (PC) or an MP3 player does not fully reproduce the low frequency component of the audio signal due to the physical limitation of its small size, which causes distortion in sound quality. An audio signal processing apparatus below has addressed this side effect and reinforces the low and intermediate frequency components of the audio signal without causing variation in sound quality.

Referring to FIG. 1, the apparatus of reinforcing low and intermediate frequency components of the audio signal comprises a filter unit 110 including a first band pass filter 111 and a second band pass filter 112, a harmonics signal generator 120, a harmonics signal controller 130, and a signal combiner 140.

The first band pass filter 111 separates a signal having a low frequency band (between 20 Hz and 200 Hz) from the audio signal. It is unnecessary to process an audio signal included in a band that is not reproduced according to the characteristics of an audio signal reproducing apparatus. To this end, the band pass filter, rather than a low pass filter, is needed.

The second band pass filter 112 separates a signal having an intermediate frequency band (between 200 Hz and 2 KHz) from the audio signal.

The harmonics signal generator 120 generates a plurality of harmonics signals using the band pass filtered audio signals. The harmonics signals can be generated through single side band modulation. The single side band modulation uses one of upper side band and lower side band signals that are generated through amplitude modulation (AM), which reduces by half an occupied frequency bandwidth and transmission power consumption.

The harmonics signal controller 130 controls the energy volume of the harmonics signals generated by the harmonics signal generator 120.

The signal combiner 140 combines the harmonics signals controlled by the harmonics signal controller 130 and the audio signal, reinforces the low and intermediate frequency components of the combined signal, and outputs an audio signal having the reinforced low and intermediate frequency components.

FIG. 2 is a block diagram of a related art apparatus for enhancing a video signal of an image processing system. In particular, the apparatus enhances an image based on a color gamut and skin tone.

Referring to FIG. 2, the video image enhancing apparatus comprises an image enhancement unit 210, a color gamut range detection unit 220, a luminance adaptation processing unit 230, a saturation adaptation processing unit 240, and a hue adaptation processing unit 250.

The image enhancement unit 210 enhances an image of a luminance signal that is input using general image enhancement algorithm and outputs the image enhanced luminance signal $Y_{enh}$.

The color gamut range detection unit 220 detects a maximum value $Y_{max}$ and a minimum value $Y_{min}$ of luminance expressed by a given pixel and a maximum value $C_{max}$ and a minimum value $C_{min}$ of a chrominance signal using input saturation signal C and hue signal H.

The luminance adaptation processing unit 230 outputs an image enhanced luminance signal $Y_{YA}$ based on mapping of the color gamut. In more detail, the luminance adaptation processing unit 230 adaptively determines the luminance signal $Y_{YA}$ based on the relationship between a luminance Y value of the given pixel and the maximum value $Y_{max}$ of the luminance signal within the scope of the color gamut detected by the color gamut range detection unit 220, or the relationship between the luminance signal $Y_{YA}$ based on the relationship between the luminance value Y of the given pixel and the minimum value $Y_{min}$ of the luminance signal within the scope of the color gamut detected by the color gamut range detection unit 220. $Y_{enh}$ denotes the image enhanced luminance signal provided by the image enhancement unit 210. $Y_{max}$ denotes a maximum value of luminance expressed by the given pixel.

The saturation adaptation processing unit 240 outputs an image enhanced saturation signal $C_{CA}$ based on the mapping of the color gamut using the relationship between a value of the saturation signal C of the given pixel and the maximum value $C_{max}$ or the relationship between the value of the saturation signal C and the minimum value $C_{min}$ within the scope of the color gamut provided by the color gamut range detection unit 220. C denotes is the saturation signal of an input pixel. $C_{max}$ denotes a maximum value of saturation expressed by the given pixel. $C_{CA}$ denotes the adaptively image enhanced saturation signal based on the mapping of the color gamut. H denotes the hue signal.

The hue adaptation processing unit 250 outputs image enhanced luminance $Y_{HA}$ and saturation CHA based on a skin ton region using the luminance Y of the given pixel, the image enhanced luminance $Y_{enh}$, and the adaptively image enhanced luminance $Y_{YA}$ provided by the luminance adaptation processing unit 230, and the saturation C of the given pixel, the hue H, and the adaptively image enhanced saturation $C_{CA}$ provided by the saturation adaptation processing unit 240. Y denotes the luminance of the input pixel. $Y_{enh}$ denotes the image enhanced luminance provided by the image enhancement unit 210.

As described above, the audio signal or the video signal is processed in each domain using a variety of methods so that a signal having a specific enhanced component can be output.

However, quality of an output sequence that can be experienced by a person who is an end user is not experienced interdependently from visual and auditory sense but is determined by simultaneous stimuli via interaction.

Therefore, a method of adaptively controlling a video signal based on the characteristics of an input audio signal or adaptively controlling the audio signal based on the characteristics of the video signal and interdependently enhancing output sound and image is needed.

SUMMARY OF THE INVENTION

The present invention provides a method and apparatus for analyzing audio and video signals included in a multimedia input sequence and interdependently enhancing the audio and video signals.

According to an aspect of the present invention, there is provided a method of controlling audio and video signals comprising: analyzing the characteristics of components of the audio and video signals; interdependently modifying the audio signal and/or video signal according to the analyzed characteristics of components of the audio and video signals; and synchronizing the modified audio and video signals.

The interdependently modifying the audio signal and/or video signal may comprise: controlling the components of the video signal based on the characteristics of components of the audio signal; or controlling the components of the audio signal based on the characteristics of components of the video signal.

The analyzing the characteristics of components of the audio and video signals may comprise: analyzing at least one of a frequency, an amplitude, and a phase of the audio signal; and analyzing at least one of a motion vector, a luminance component, and a chrominance component of the video signal.

The interdependently modifying the audio signal and/or video signal may further comprise: if the analyzed frequency of the audio signal belongs to a high or low frequency region, increasing or reducing a value of the luminance component of the video signal.

The interdependently modifying the audio signal and/or video signal may further comprise: comparing the analyzed motion vector of the video signal and a predetermined threshold value, and increasing or reducing the amplitude of the audio signal according to the comparison result.

The synchronizing the modified audio and video signals may comprise: synchronizing the modified audio and video signals continuously or after separately storing the modified audio and video signals.

The synchronizing the modified audio and video signals may further comprise: generating a signal for controlling the synchronization of the modified audio and video signals.

According to another aspect of the present invention, there is provided an apparatus for controlling audio and video signals comprising: an audio signal analyzing unit analyzing the characteristics of components of the audio signal; a video signal analyzing unit analyzing the characteristics of components of the video signal; an adaptive signal processing unit interdependently modifying the audio signal and/or video signal according to the analyzed characteristics of components of the audio and video signals; and an synchronizing unit synchronizing the modified audio and video signals.

The adaptive signal processing unit may control the components of the video signal based on the characteristics of components of the audio signal, or control the components of the audio signal based on the characteristics of components of the video signal.

The audio signal analyzing unit may analyze at least one of a frequency, an amplitude, and a phase of the audio signal, and video signal analyzing unit analyzes at least one of a motion vector, a luminance component, and a chrominance component of the video signal.

The adaptive signal processing unit, if the analyzed frequency of the audio signal belongs to a high or low frequency region, may increase or reduce a value of the luminance component of the video signal.

The adaptive signal processing unit may compare the analyzed motion vector of the video signal and a predetermined threshold value, and increase or reduce the amplitude of the audio signal according to the comparison result.

The synchronizing unit may synchronize the modified audio and video signals continuously or after separately storing the modified audio and video signals.

The synchronizing unit may generate a signal for controlling the synchronization of the modified audio and video signals.

According to another aspect of the present invention, there is provided a computer readable recording medium storing a computer readable program for the method of controlling audio and video signals.

According to another aspect of the present invention, there is provided an image reproduction device mounted with the apparatus for controlling audio and video signals.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

The attached drawings for illustrating exemplary embodiments of the present invention are referred to in order to gain a sufficient understanding of the present invention, the merits thereof, and the objectives accomplished by the implementation of the present invention.

The present invention will be described in detail by explaining exemplary embodiments of the invention with reference to the attached drawings.

Figure 1:
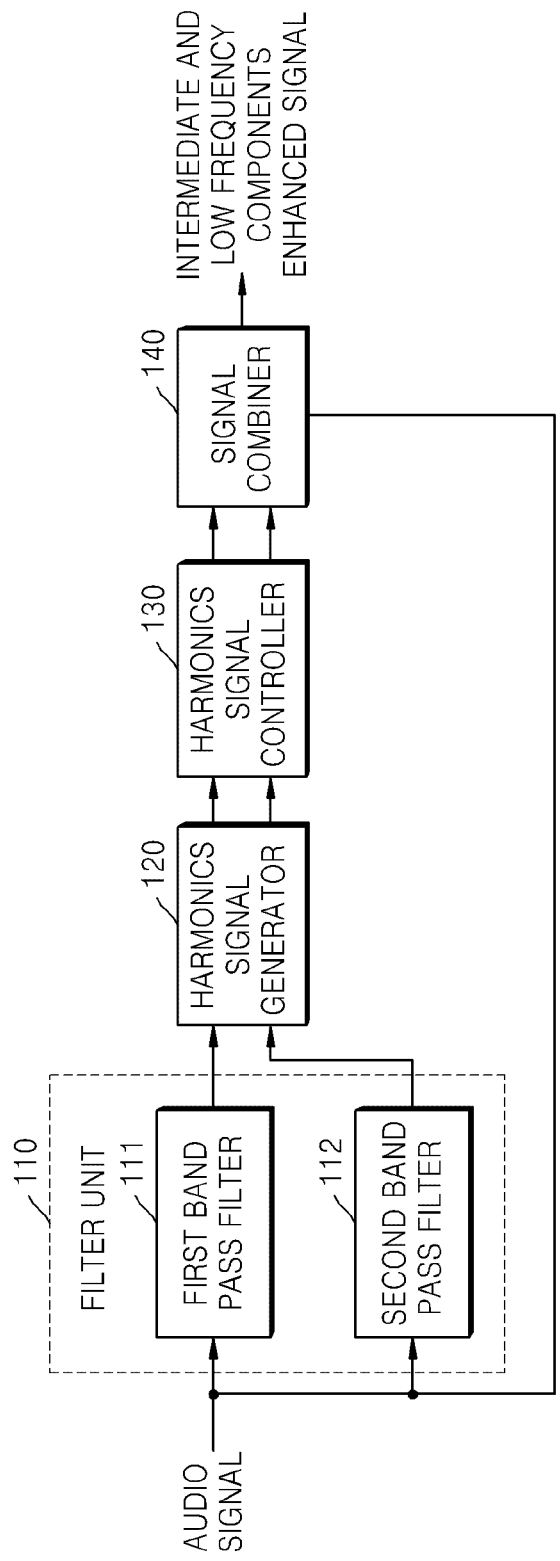
FIG. 1 is a block diagram of a related art apparatus of reinforcing low and intermediate frequency components of an audio signal.
Figure 2:
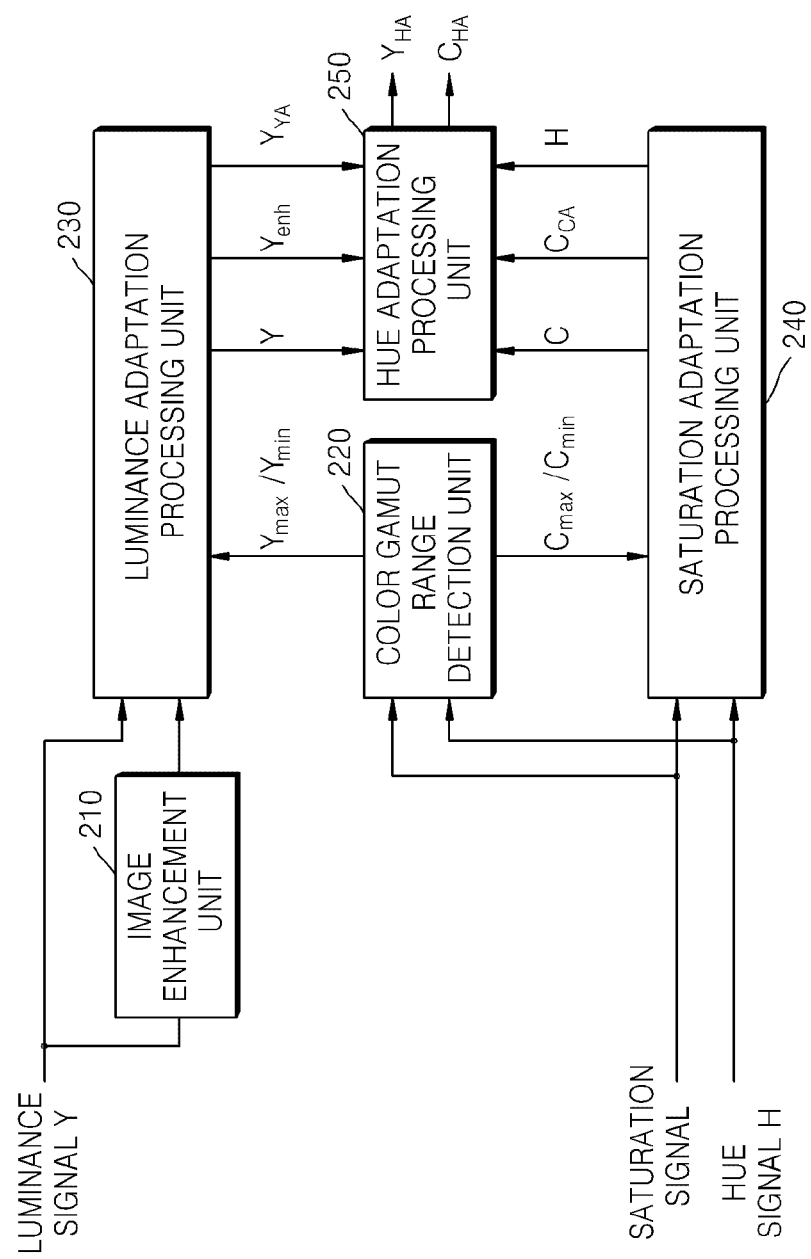
FIG. 2 is a block diagram of a related art apparatus for enhancing a video signal of an image processing system.
Figure 3:
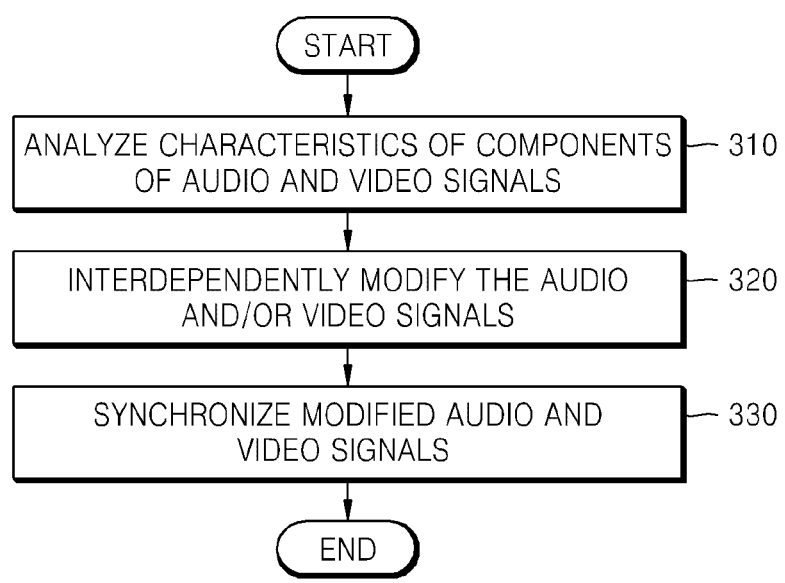
FIG. 3 is a flowchart illustrating a method of interdependently controlling audio and video signals according to an exemplary embodiment of the present invention.

FIG. 3 is a flowchart illustrating a method of interdependently controlling audio and video signals according to an exemplary embodiment of the present invention. Referring to FIG. 3, the method of interdependently controlling the audio and video signals comprises analyzing the characteristics of components of the audio and video signals (Operation 310); interdependently modifying the audio and/or video signals according to the analyzed characteristics of components of the audio and video signals (Operation 320); and synchronizing the modified audio and video signals (Operation 330).

First, the audio and video signals are received.

The audio and video signals are analyzed to detect their respective characteristics by analyzing components thereof (Operation 310).

The audio signal includes components such as frequency, amplitude, and phase values. In addition, a waveform, a sound pressure, a peak point, a trough point, a Fourier transform function or the like can be used to analyze the audio signal.

The video signal includes components such as a luminance component, a chrominance component, a motion vector or the like. Various parameters can be used to analyze the video signal.

Thereafter, the audio and video signals are modified based on the result of analysis (Operation 320). In more detail, the components of the video signal are controlled based on the analyzed characteristics of the components of the audio signal, or the components of the audio signal are controlled based on the analyzed characteristics of the components of the video signal.

An exemplary embodiment of the modification of the audio signal and/or the video signal will now be in detail described with reference to FIG. 4.

Since the modified audio and video signals have different processing results in view of quantity or time, it is necessary to synchronize the modified audio and video signals (Operation 330).

The modified audio and video signals are synchronized continuously or after both signals are separately stored.

Figure 4:
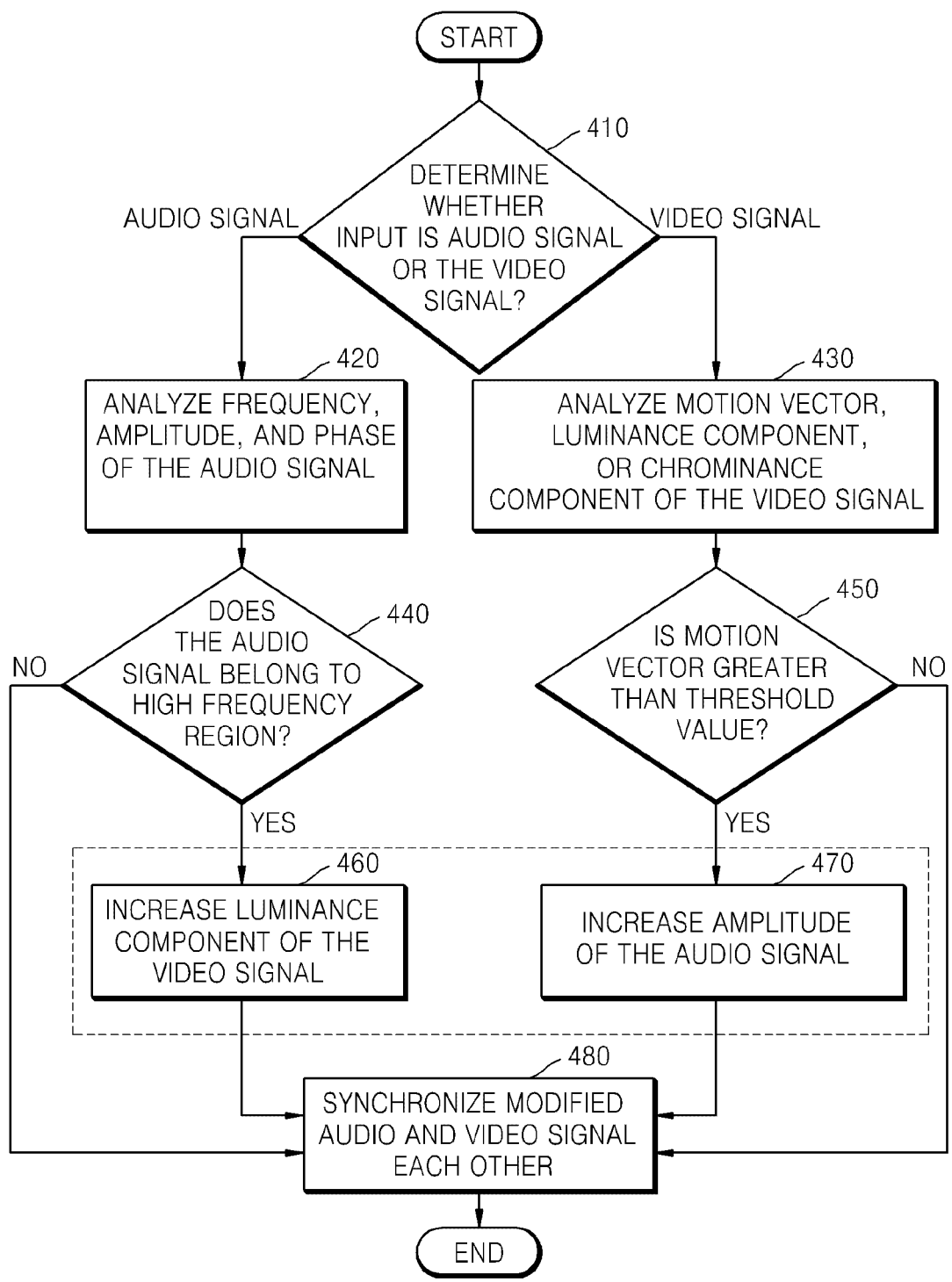
FIG. 4 is a flowchart illustrating a method of controlling audio and video signals according to another exemplary embodiment of the present invention.

FIG. 4 is a flowchart illustrating a method of controlling audio and video signals according to another exemplary embodiment of the present invention. Referring to FIG. 4, it is determined whether the audio signal or the video signal is input (Operation 410), and the characteristics of a component of each signal are analyzed (Operations 420 and 430).

If it is determined that the audio signal is input, as mentioned in the previous exemplary embodiment, the components of the audio signal, i.e., frequency, amplitude, and phase values, are analyzed (Operation 420).

For example, the frequency of the audio signal is analyzed. If the frequency of the audio signal belongs to a high frequency region (Operation 440), an image generally varies when a sudden change of scene or a climax scene is displayed. Thus, a luminance component of the video signal can be increased (Operation 460), so that the video signal having increased luminance component can be displayed as an image having the distinct contrast between light and shade. In the present exemplary embodiment, the audio signal belongs to the high frequency region. However, although the audio signal belongs to a low frequency region, the luminance component of the video signal can vary in connection with the image.

When the audio signal belongs to the high or low frequency region, it is possible to increase the luminance component of the video signal, or reduce luminance component of the video signal according to experimental data.

If it is determined that the video signal is input, the representative components of the video signal, i.e. a motion vector, a luminance component, or a chrominance component, are analyzed (Operation 430).

When the motion vector of the video signal is analyzed, if the motion vector is greater than a threshold value that is an experimental value (Operation 450), that is, if an object moves frequently on a screen of an image, in connection with sound, since a sound effect is distinguished in an active atmosphere, the amplitude of the audio signal can be increased (Operation 470). If the motion vector is smaller than the threshold value, the amplitude of the audio signal can be increased or reduced according to an exemplary embodiment method.

Since the audio and video signals can be interdependently modified in Operations 460 and 470, the user can experience multimedia content including more substantially enhanced sound and image.

The modified audio and video signal are synchronized to each other (Operation 480). For example, in order to display an image including increased luminance component, a signal for controlling a back light unit (BLU) of a liquid crystal display (LCD) monitor can be generated.

Figure 5:
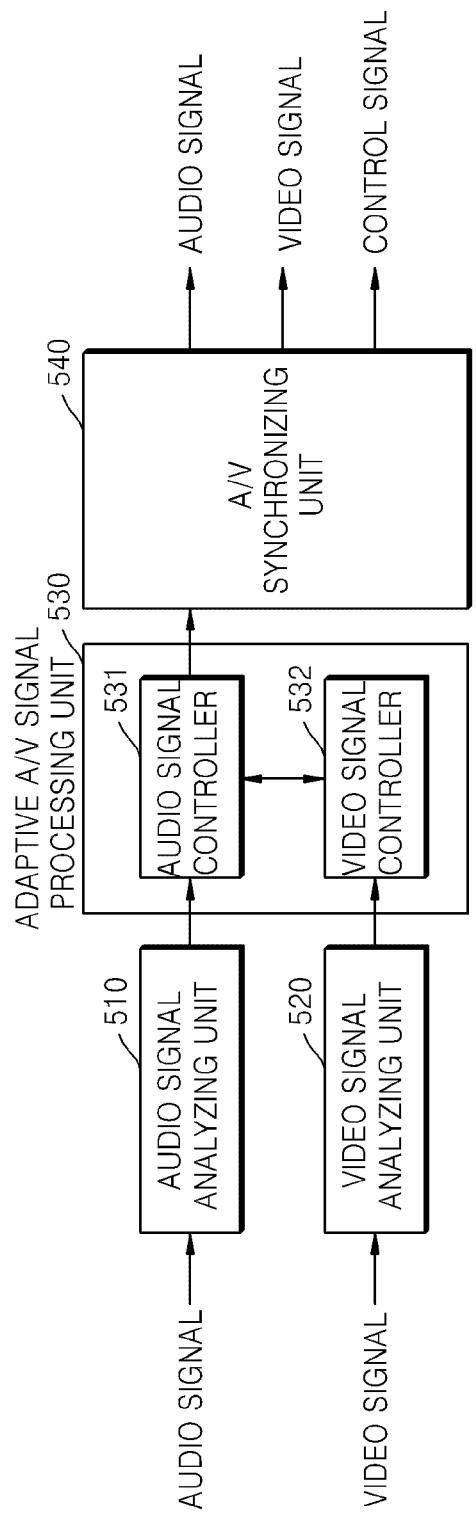
FIG. 5 is a block diagram of an apparatus for controlling audio and video signals according to an exemplary embodiment of the present invention.

FIG. 5 is a block diagram of an apparatus for controlling audio and video signals according to an exemplary embodiment of the present invention. Referring to FIG. 5, the an apparatus for controlling audio and video signals comprises an audio signal analyzing unit 510 for analyzing the characteristics of a component of the audio signal, a video signal analyzing unit 520 for analyzing the characteristics of a component of the video signal, an adaptive audio/video (A/V) signal processing unit 530 for interdependently modifying the audio signal and/or video signal, and an A/V synchronizing unit 540 for synchronizing the modified audio and video signals.

The adaptive A/V signal processing unit 530 comprises an audio signal controller 531 and a video signal controller 532. The A/V synchronizing unit 540 can generate a signal for controlling a monitor or a speaker in order to synchronize the modified audio and video signals and the synchronized audio and video signals.

The method of interdependently enhancing audio and video signals according to the present invention can be embodied as a computer readable program, and realized in a general-purpose computer capable of executing the program via a computer readable recoding medium.

Also, the data structures used in the above exemplary embodiments can be recorded on a computer readable medium via various devices.

Examples of the computer readable recording medium include a magnetic storage medium, e.g., read-only memory (ROM), a floppy disk, and a hard disc; and an optical recording medium, e.g., a CD-ROM, a digital versatile disc (DVD).

According to the exemplary embodiments of the present invention, a method and apparatus for interdependently enhancing audio and video signals analyze the audio and video signals in a multimedia input sequence including audio and video signal components and interdependently modify the audio and video signals, so that a user can experience multimedia content including more virtually enhanced sound and image.

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of controlling audio and video signals, the method comprising:
    configuring at least one processor to perform the functions of:
    analyzing characteristics of components of the audio and video signals;
    interdependently modifying at least one of (i) the audio signal according to the analyzed characteristics of the components of the video signal and (ii) the video signal according to the analyzed characteristics of the components of the audio signal; and
    synchronizing the audio and video signals after the interdependently modifying.

2. The method of claim 1, wherein the interdependently modifying comprises:
    controlling the components of the video signal based on the characteristics of the components of the audio signal; or
    controlling the components of the audio signal based on the characteristics of the components of the video signal.

3. The method of claim 2, wherein the analyzing the characteristics of the components of the audio and video signals comprises:
    analyzing at least one of a frequency, an amplitude, and a phase of the audio signal; and
    analyzing at least one of a motion vector, a luminance component, and a chrominance component of the video signal.

4. The method of claim 3, wherein the interdependently modifying further comprises:
    if the analyzed frequency of the audio signal belongs to a high or low frequency region, increasing or reducing a value of the luminance component of the video signal.

5. The method of claim 3, wherein the synchronizing the audio and video signals comprises:
    synchronizing the audio and video signals continuously or after separately storing the audio and video signals.

6. The method of claim 5, wherein the synchronizing the audio and video signals further comprises:
    generating a signal for controlling the synchronizing the audio and video signals.

7. The method of claim 3, wherein the interdependently modifying further comprises:
    comparing the analyzed motion vector of the video signal and a threshold value, and increasing or reducing the amplitude of the audio signal according to a result of the comparing.

8. An apparatus for controlling audio and video signals, the apparatus comprising:
    an audio signal analyzing unit which analyzes characteristics of components of the audio signal;
    a video signal analyzing unit which analyzes characteristics of components of the video signal;
    an adaptive signal processing unit which interdependently modifies at least one of (i) the audio signal according to the analyzed characteristics of the components of the video signal and (ii) the video signal according to the analyzed characteristics of the components of the audio signal; and
    a synchronizing unit which synchronizes the audio and video signals which are output from the adaptive signal processing unit.

9. The apparatus of claim 8, wherein the adaptive signal processing unit controls the components of the video signal based on the characteristics of components of the audio signal, or controls the components of the audio signal based on the characteristics of components of the video signal.

10. The apparatus of claim 9, wherein the audio signal analyzing unit analyzes at least one of a frequency, an amplitude, and a phase of the audio signal, and
    the video signal analyzing unit analyzes at least one of a motion vector, a luminance component, and a chrominance component of the video signal.

11. The apparatus of claim 10, wherein the adaptive signal processing unit, if the analyzed frequency of the audio signal belongs to a high or low frequency region, increases or reduces a value of the luminance component of the video signal.

12. The apparatus of claim 10, wherein the synchronizing unit synchronizes the audio and video signals continuously or after separately storing the audio and video signals.

13. The apparatus of claim 12, wherein the synchronizing unit generates a signal for controlling the synchronization of the audio and video signals.

14. The apparatus of claim 10, wherein the adaptive signal processing unit compares the analyzed motion vector of the video signal and a threshold value, and increases or reduces the amplitude of the audio signal according to a result of the comparison.

15. A non-transitory computer readable recording medium storing a computer readable program for performing the method of claim 1.

16. An image reproduction device comprising an apparatus for controlling audio and video signals, the apparatus comprising:
    an audio signal analyzing unit which analyzes characteristics of components of the audio signal;
    a video signal analyzing unit which analyzes characteristics of components of the video signal;
    an adaptive signal processing unit which interdependently modifies at least one of (i) the audio signal according to the analyzed characteristics of the components of the video signal and (ii) the video signal according to the analyzed characteristics of the components of the audio signal; and
    a synchronizing unit which synchronizes the audio and video signals which are output from the adaptive signal processing unit.

* * * * *